United States Patent

Feustel et al.

[11] Patent Number: 5,891,944
[45] Date of Patent: Apr. 6, 1999

[54] PROCESS FOR THE PRODUCTION OF EMULSION POLYMERS

[75] Inventors: Dieter Feustel, Monheim; Ulrich Eicken, Korschenbroich; Thomas Engels, Frechen, all of Germany

[73] Assignee: Henkel Kommaiditgesellschaft auf Aktien, Duesseldorf, Germany

[21] Appl. No.: 696,887

[22] PCT Filed: Feb. 9, 1995

[86] PCT No.: PCT/EP95/00461

§ 371 Date: Aug. 19, 1996

§ 102(e) Date: Aug. 19, 1996

[87] PCT Pub. No.: WO95/22564

PCT Pub. Date: Aug. 24, 1995

[30] Foreign Application Priority Data

Feb. 18, 1994 [DE] Germany .......................... 44 05 204.9

[51] Int. Cl.⁶ ............................................. C08K 5/10
[52] U.S. Cl. ............................................ 524/311; 524/773
[58] Field of Search ........................ 524/311, 773

[56] References Cited

U.S. PATENT DOCUMENTS

| | | | |
|---|---|---|---|
| 2,454,546 | 11/1948 | Bock et al. | 260/75 |
| 2,470,629 | 5/1949 | Mack | 260/23.7 |
| 2,489,943 | 11/1949 | Wilson et al. | 260/75 |
| 3,563,904 | 2/1971 | Schmadel et al. | 252/152 |
| 3,759,886 | 9/1973 | Turner | 260/92.3 |
| 5,277,978 | 1/1994 | Feustel et al. | 428/402 |

FOREIGN PATENT DOCUMENTS

| | | |
|---|---|---|
| 1 065 095 | 10/1979 | Canada . |
| 020 906 | 1/1981 | European Pat. Off. . |
| 16 17 123 | 2/1971 | Germany . |
| 2 210 957 | 11/1972 | Germany . |
| 25 06 156 | 8/1975 | Germany . |
| 29 04 395 | 8/1979 | Germany . |
| 35 19 678 | 12/1986 | Germany . |
| 39 39 918 | 6/1991 | Germany . |
| 1 382 314 | 1/1975 | United Kingdom . |

OTHER PUBLICATIONS

Römpps, Chemie Lexikon, 9th Edition (1990), Thieme Verlag, vol. 2, p. 1159.

Chemical Economical Handbook, Styrene–Butadiene–Elastomers, Apr. 1991, 525.36OOG.

Ullmann's Enzyklopädie der Technischen Chemie, 3rd Ed., vol. 9, p. 337.

Ind. Eng. Chem., 40, (1948) p. 2193.

Chem. Eng. Prog., 43, (1947) p. 391.

*Primary Examiner*—Peter D. Mulcahy
*Attorney, Agent, or Firm*—Ernest G. Szoke; Wayne C. Jaeschke; Daniel S. Ortiz

[57] ABSTRACT

A secondary stabilizer for emulsion polymers is disclosed. The secondary stabilizer is a polyester containing diol residues, residues of olefinically unsaturated dicarboxylic acids which carry sulfonate groups and residues of dicarboxylic acids which do not contain olefinic unsaturation or sulfonate groups. The residues of the olefinically unsaturated dicarboxylic acids comprise from 70 mole-% to 99 mole-% of dicarboxylic acid residues in the polyester and from 1 mole-% to 30 mole-% of residues of dicarboxylic acids which do not contain olefinic unsaturation or sulfonate groups. The polyester secondary stabilizer is not a surfactant (does not significantly lower the surface tension of water) and in addition is biodegradable.

19 Claims, No Drawings

PROCESS FOR THE PRODUCTION OF EMULSION POLYMERS

FIELD OF THE INVENTION

This invention relates to a process for the production of emulsion polymers in the presence of primary and secondary stabilizers in the form of polyesters containing sulfo groups with improved biological degradability.

BACKGROUNDS OF THE INVENTION

Polymer dispersions are normally produced by the process of emulsion polymerization in which water-insoluble monomers are polymerized in aqueous phase in the presence of emulsification or dispersion aids. The process may be used for the production of polymer dispersions from virtually any water-insoluble or only partly water-soluble monomers such as, for example, acrylic or methacrylic acid esters, vinyl esters, styrene, butadiene, chloroprene, acrylonitrile or vinyl chloride.

In general, the emulsifiers used are surface-active substances which control the course of the polymerization and which stabilize the product formed. Stabilizing means preventing individual polymer particles in the dispersions from coagulating to form relatively large agglomerates. The process of emulsion polymerization has been known for decades and is described in sufficient detail in standard works (see, for example, Römpps. Chemie Lexikon, 9th Edition, (1990), Thieme Verlag, Vol. 2, page 1159 and the literature cited therein).

Emulsion polymerization is used for the production of polymers which are used both as dispersions, for example in binders for paints or adhesives, and in bulk as a source for plastics or elastomers.

In the production of plastics or elastomers in bulk, the polymer dispersions are normally dried to remove the water present and to enable the plastic or the elastomer to be recovered in pure form. In many cases, the plastic or the elastomer is recovered by spray drying or by coagulation and subsequent drying. The necessary destruction of the dispersions in this process means that the polymer dispersions should not be particularly stable. Accordingly, it is preferred to use emulsifiers which, although enabling the dispersions to be produced without difficulty, do not unnecessarily complicate their subsequent destruction. Particular advantages are afforded by emulsifiers which can be specifically chemically modified in such a way that they completely lose their surface-active and stabilizing properties. The generally unwanted effect on the end product (for example sensitivity to water or lack of heat resistance) of the emulsifiers remaining therein can be avoided in this way.

This process is used in particular in the production of elastomers where the emulsifiers used are fatty soaps or resin soaps which can be converted into non-surface-active compounds by pH reduction. The latex produced and stabilized with soaps can be completely or partly coagulated by pH reduction, the fatty acids remaining in the elastomers as desired additives with no adverse effect as emulsifiers.

However, by comparison with other standard emulsifiers, such as alkyl sulfates or sulfonates, the soaps are poorer emulsifiers, i.e. although their use allows a polymerization to be carried out, a considerable percentage of coagulated polymer actually occurs during preparation of the emulsion or removal of the residual monomers as a result of shear forces, boiling processes or other mechanical influences. The coagulated fractions contaminate the polymerization reactor with each batch so that it has to be continually cleaned. Since the cleaning of the reactor reduces its capacity, attempts have been made to reduce the formation of coagulate by using secondary stabilizers (co-stabilizers).

RELATED ART

Water-soluble secondary stabilizers of the naphthalene sulfonic acid/formaldehyde condensate type have been known for some time for the synthesis of latices using styrene, butadiene and chloroprene. These secondary stabilizers are added to the latices before, during or after their production. They prevent the formation of significant quantities of coagulate during the emulsion polymerization, but—in contrast to the emulsifiers—are only adsorbed very weakly on the surface of the polymer particles in the latex so that they can be washed out again after the coagulation of the latex to recover the elastomer.

Several processes for using naphthalene sulfonic acid/formaldehyde condensates are described in the literature. The secondary stabilizers are used in styrene or styrene/butadiene systems in concentrations of around 0.05 to 0.5%. Formulation examples can be found in U.S. Pat. Ser. No. 2,470,629 and in Chemical Economical Handbook, Styrene-Butadiene-Elastomers, April 1991, 525.3600G.

Up to 0.75% of the secondary stabilizers are used in the production of polychloroprene (see Ullmann's Enzyklopädie der Technischen Chemie, 3rd Edition, Vol. 9, page 337). To recover polychloroprene, the latex is first destabilized by acidification and then precipitated by freeze-coagulation, as described in Ind. Eng. Chem., 40, 2193 (1948) and Chem. Eng. Prog., 43, 391 (1947). The freeze-coagulated elastomer is then washed and the secondary stabilizer removed.

The washing water accumulating after the coagulation process contains most of the secondary stabilizers added to the polymerization process. They also act as excellent dispersants in the washing water where every possible hydrophobic particle can be solubilized. In case where, above all, these substances enter sewage treatment plants, particles of suspended matter can be prevented from sedimenting. Since naphthalenesulfonic acid/formaldehyde condensates are not biodegradable polymers, they retain their effect throughout the entire sewage treatment process. By preventing the treated sludge from sedimenting, they can seriously impair the operation of the sewage treatment plant.

Accordingly, it would be desirable on ecological grounds to replace the class of naphthalene sulfonic acid/formaldehyde condensates by similarly effective, but more readily biodegradable substances.

An attempt to find corresponding alternatives for emulsion polymerization stabilizers with reference by way of example to the production of chloroprene is described in DE-OS 2 210 957.

The most suitable substance is said to be octyl sulfate which sufficiently stabilizes the latex, can be washed out and foams only slightly. Despite this property spectrum, the product is not really suitable as a replacement for naphthalenesulfonic acid/formaldehyde condensates because—in contrast to octyl sulfate—these products do not reduce surface tension.

Polyesters containing sulfosuccinic acid units are also known.

Polyesters of sulfosuccinic acid and $C_{6-18}$ diols are described in U.S. Pat. Ser. No. 2,454,546. These polyesters may be used for stabilizing o/w emulsions and inter alia for stabilizing polymerizable material before polymerization. A detailed description of the procedure used to carry out the polymerizations is not given in this document.

U.S. Pat. Ser. No. 2,489,943 describes polyesters of 2-ethylhexane-1,3-diol and sulfosuccinic acid as non-foaming emulsion polymerization dispersants which do not have any of the disadvantages of sulfonated formaldehyde/naphthalene condensates, such as yellowing and discoloration. According to the teaching of this document, the polyesters are used as sole emulsifier in the emulsion polymerization process. Their biological degradability is not mentioned.

Polyesters of sulfosuccinic acid and $C_{2-4}$ diols are claimed as redeposition inhibitors for detergents in DE-OS 16 17 123.

DE-OS 25 06 156 describes polyesters of diols, unsaturated dicarboxylic acids and saturated dicarboxylic acids into which sulfo groups are introduced by addition of hydrogen sulfite onto the double bonds of the unsaturated dicarboxylic acids. The polyesters are used for the production of aqueous dispersions of solids and, in particular, as auxiliaries for the dyeing of textile fibers.

DE-OS 29 04 395 describes polyesters of diols containing 2 to 8 carbon atoms, optionally cyclic diols or polyalkylene glycols, unsaturated dicarboxylic acids, optionally saturated dicarboxylic acids and a dicarboxylic acid obtainable by addition of acrylic acid onto linoleic acid. The sulfo groups are introduced into the polymer by addition of hydrogen sulfite onto the double bonds of the unsaturated dicarboxylic acids. The polyesters are used for the production of aqueous dispersions of dyes. It is mentioned in this document that, in general, the polyesters are readily degradable. There is no indication or experimental proof that this is intended to mean biological degradability.

DE-OS 35 19 678 describes polyesters of carboxylic acid dialkanolamides and sulfodicarboxylic acids as dispersants for coal suspensions.

DE-OS 39 39 918 describes polyesters produced from dicarboxylic acids, such as sulfosuccinic acid and diols with molecular weights of 2,000 to 100,000, as suitable emulsifiers for emulsion polymerization. As stabilizers, however, they have to form agglomerates similarly to the primary stabilizers (for example soaps), so that at most 50% of the monomers contain sulfate or sulfonate groups. The polyesters in question are unsuitable as secondary stabilizers on account of their agglomeration.

The problem addressed by the present invention was to provide a process for the production of emulsion polymers in which a secondary stabilizer with a balanced ratio of hydrolysis stability and hence stabilizing activity to hydrolysis lability and hence biological degradability is used in addition to a primary stabilizer.

Other requirements which the secondary stabilizer is expected to satisfy are that it should stabilize the polymer dispersion and should be removable from the coagulate by washing, should only reduce the surface tension of water negligibly, if at all, i.e. should not have any—or only slight— wetting properties, and, moreover should not additionally increase the viscosity of the reaction mixture.

BRIEF DESCRIPTION OF THE INVENTION

According to the invention, this problem has been solved by a process for the production of emulsion polymers in the presence of a primary stabilizer and a secondary stabilizer, characterized in that polyesters of a) diols,
b) dicarboxylic acids containing sulfo groups in quantities of 99 to 70 mole-%, based on the total quantity of dicarboxylic acid, and
c) dicarboxylic acids with no sulfo groups in quantities of 1 to 30 mole-%, based on the total quantity of dicarboxylic acid, are used as the secondary stabilizer.

The production of the polyesters for the process according to the invention may be carried out by methods known per se.

For example, the dicarboxylic acids containing sulfo groups, the dicarboxylic acids with no sulfo groups and the diols may be reacted in an esterification reaction to form polyesters.

The polyesters may also be produced by a transesterification reaction of the diols with esters of the dicarboxylic acids mentioned with lower alcohols, for example methanol, ethanol, propanol and butanol.

The sulfo groups may also be introduced by addition of hydrogen sulfite residues onto dicarboxylic acid residues containing olefinic double bonds. The polyesters containing double bonds required for this purpose may be produced from dicarboxylic acids containing olefinic double bonds, dicarboxylic acids with no sulfo groups and diols in known manner by esterification or transesterification.

DETAILED DESCRIPTION OF THE INVENTION

Preferred linear or branched diols containing 2 to 10 carbon atoms are ethane-1,2-diol, propane-1,2-diol, propane-1,3-diol, butane-1,2-diol, butane-1,3-diol, butane-1,4-diol, pentane-1,5-diol, 2-methylbutane-1,4-diol, 2,2-dimethylpropane- 1,3-diol, hexane-1,6-diol, decane-1,10-diol and 1,4-dihydroxymethyl cyclohexane or mixtures thereof. The adducts of 1 to 5 moles of ethylene oxide or propylene oxide with the diols mentioned above are also suitable.

Adducts of ethylene oxide and/or propylene oxide with dihydric phenols, for example with hydroquinone, resorcinol, bisphenol A, bisphenol F or bisphenol S, may also be used.

The commercially available adducts of ethylene and/or propylene oxide with bisphenol A are preferably used.

Both aromatic dicarboxylic acids, for example sulfoisophthalic acid, and aliphatic dicarboxylic acids containing sulfo groups may be used. Sulfosuccinic acid is preferably used.

The molar quantities of dicarboxylic acid containing sulfo groups are between 70 and 99 mole-% and preferably between 90 and 99 mole-%, based on the total quantity of dicarboxylic acid.

Examples of dicarboxylic acids with no olefinic double bonds are oxalic acid, malonic acid, glutaric acid, adipic acid, suberic acid, sebacic acid, 1,11 -undecanedioic acid, 1,12-dodecanedioic acid, phthalic acid, isophthalic acid, terephthalic acid, hexahydrophthalic acid, tetrahydrophthalic acid or dimer fatty acid. Linear aliphatic dicarboxylic acids containing 1 to 3 or 5 to 18 carbon atoms are preferred, adipic acid being particularly preferred.

The molar quantities of dicarboxylic acid with no sulfo groups are between 1 and 30 mole-% and preferably between 1 and 10 mole-%, based on the total quantity of dicarboxylic acid.

If sulfo groups are to be introduced by the addition of hydrogen sulfite onto olefinic double bonds, dicarboxylic acids containing olefinic double bonds or functional derivatives thereof, such as anhydrides or esters of lower alcohols, may be used in admixture with other dicarboxylic acids containing no olefinic double bonds or derivatives thereof for the production of polyesters.

The molar quantities of dicarboxylic acid containing olefinic double bonds are between 70 and 99 mole-% and preferably between 90 and 99 mole-%, based on the total quantity of dicarboxylic acid.

Preferred dicarboxylic acids containing olefinic double bonds are maleic acid or fumaric acid. Maleic anhydride is particularly preferred.

The equivalent ratio of COOH to OH in the esterification of the diols with the dicarboxylic acids is generally between 2:1 and 1:2 and preferably between 1.5:1 and 1:1.5. As already known, the molecular weight of the resulting polyesters can be adjusted through the molar ratio of carboxyl groups to hydroxyl groups and through the conversion rate in the esterification reaction.

The polyesters containing sulfo groups used in the process according to the invention have a molecular weight (number average) of 1,000 to 25,000 and preferably in the range from 2,000 to 10,000.

The esterification may be carried out in the usual way by heating the mixture of diols and dicarboxylic acids to temperatures of 100° to 250° C. and removing the water of reaction.

Since the dicarboxylic acids containing olefinic double bonds tend to polymerize at the high esterification temperatures, it is advisable to add a suitable polymerization inhibitor. Inhibitors familiar to the expert are, for example, substituted or unsubstituted phenols, such as hydroquinone, 2,4-t-butylphenol and ionol or phenothiazine or triphenyl phosphite. The polymerization inhibitors may be added in quantities of 0.001 to 1% by weight, based on the mixture as a whole.

Typical catalysts, such as strong acids, for example sulfuric acid, phosphoric acid or toluene sulfonic acid, may be added in quantities of 0.1 to 5% by weight, based on the mixture as a whole, to accelerate the reaction. Typical tin compounds which accelerate the esterification reaction, for example tin dioctoate, tin oxalate, tin oxide or even elemental tin in the form of tin grindings, may also be added in quantities of 0.01 to 0.2% by weight, based on the mixture as a whole.

An organic solvent which forms an azeotrope with water may be used to remove the water of reaction. Solvents well known for this purpose are, for example, toluene, cyclohexane, n-hexane or xylene.

In the addition of hydrogen sulfite ions onto the double bonds of the dicarboxylic acid units in the polyester which follows the esterification reaction, the reaction takes place more quickly with cis-substituted double bonds. Accordingly, it can be of advantage to produce polyesters with a high percentage content of cis-substituted double bonds.

In one preferred embodiment, a particularly high percentage of these double bonds is achieved by selecting the esterification temperature so that there is still no significant degree of isomerization to form the thermodynamically more stable trans-substituted product. This can be achieved by carrying out the esterification reaction at relatively low temperatures. In this case, a relatively low-boiling solvent, for example toluene, cyclohexane or petroleum fractions with boiling points of 80° to 1 50° C., and/or a relatively large quantity, for example 1 to 5% by weight, based on the sum of diols and dicarboxylic acids, of acidic esterification catalyst is used to remove the water of reaction.

The percentage of cis- or trans-substituted double bonds can be determined by methods known to the expert, more particularly by the evaluation of $^1$H-NMR spectra. Since the protons at cis- or trans-substituted double bonds show very different chemical shifts, the relative content of cis-double bonds may readily be determined by integration of the signals.

In addition to the esterification of dicarboxylic acids or anhydrides thereof, the polyesters may also be prepared by transesterification of dicarboxylic acid esters, for example maleic acid dimethyl ester or diethyl esters, with diols. Instead of the water of reaction, the alcohol formed, for example methanol or ethanol, is removed in this case.

Sulfo groups may be introduced into the polyesters by addition of hydrogen sulfite onto the olefinic double bonds of the dicarboxylic acid units in the polyester in known manner by reaction of alkali metal or alkaline earth metal or ammonium salts of sulfurous or pyrosulfurous acid as sulfiting agents, for example sodium hydrogen sulfite or sodium bisulfite. 1 Mole of sodium bisulfite corresponds to 2 moles of hydrogen sulfite in the sulfitation reaction. Sodium bisulfite ($Na_2S_2O_5$) is preferably used.

The quantity of hydrogen sulfite or bisulfite is normally gauged in such a way that 50 to 200 mole-% and preferably 75 to 100 mole-% of hydrogen sulfite ions, based on double bonds, are made available for the reaction.

The polyester onto the double bonds of which hydrogen sulfite is to be added may be used in the form of a solution in an organic solvent at least partly miscible with water.

Examples of water-miscible solvents are ethanol, 1-propanol, 2-propanol, 2-butanol, 1,2-ethanediol, 1,2-propanediol, propylene glycol monomethyl ether, butyl glycol, diethylene glycol, diethylene glycol dimethyl ether, N-methyl pyrrolidone and sulfolan.

The sulfiting agent, preferably in the form of an aqueous solution, is added all at once or continuously and stirred at temperatures of 80° to 105° C. until hydrogen sulfite has been added onto all the double bonds or until a constant hydrogen sulfite content has been established.

The hydrogen sulfite content may readily be determined by methods known to the expert, for example by iodometry.

It may be advisable to add an emulsifier containing sulfo groups, preferably an ester of sulfosuccinic acid in the form of its salt with an alkali metal, to the polyester at the beginning of the sulfitation reaction. Particularly suitable esters of sulfosuccinic acid are the dioctyl ester or tridecyl ester in the form of their sodium salts. A polyester containing sulfo groups for the process according to the invention may also be added at the beginning of the sulfitation reaction, for example from a previous batch. The quantity of emulsifier added is between 0.1 and 10% by weight and preferably between 1 and 5% by weight, based on the polyester to be sulfited.

In another process, the polyester containing sulfo groups may be produced not only by esterification with a dicarboxylic acid containing olefinic double bonds and subsequent sulfitation, but also by transesterification of the alcohol component with low molecular weight esters of sulfosuccinic acid or salts thereof, for example with the sodium salt of dimethyl sulfosuccinic acid ester or dioctyl sulfosuccinic acid ester. In this case, the polyesters are synthesized with elimination of the low molecular weight alcohol. Suitable transesterification conditions are temperatures of 100° to 250° C., normal pressure or reduced pressure and the presence of typical transesterification catalysts, such as alkali metal hydroxides or alkoxides or titanium compounds or tin compounds. Towards the end of the reaction, it may be advisable to apply reduced pressure to facilitate removal of the alcohol.

The equivalent ratio of ester groups COOR to the hydroxyl groups COOR:OH may be between 2:1 and 1:2 and is preferably between 1.5:1 and 1:1.5.

If polyesters based on aromatic dicarboxylic acids containing sulfo groups or on sulfosuccinic acid are to be produced, it is advisable to heat the mixture of aromatic dicarboxylic acids containing sulfo groups, dicarboxylic acids containing no sulfo groups and diols with stirring in an inert gas atmosphere to temperatures of 100° to 250° C. and to remove the water of reaction.

The polyesters according to the invention accumulate in the form of pastes or solutions. Removal of the solvent leaves solids or viscous pastes.

The process according to the invention is suitable for the production of emulsion polymers, more especially emulsion polymers of polystyrene, styrene-containing copolymers, for example styrenelbutadiene copolymers, polychloroprene or chloroprene-containing copolymers.

The styrene-containing copolymers may be selected from styrene/butadiene, acrylonitrile/butadiene/styrene (ABS) or styrene/acrylonitrile. The styrene component is selected from styrene, α-methyl styrene, chlorostyrene or vinyl toluene.

Examples of primary stabilizers are sufficiently well known from the prior art. These primary stabilizers are selected from soaps based on native or synthetic fatty acids (for example potassium oleate) or resinic acids (for example sodium salt of abietic acid/rosin acid). The percentage content of these primary stabilizers, based on the total quantity of the system to be stabilized, is between 0.01 and 5% by weight and preferably between 0.01 and 3% by weight.

The polyester containing sulfo groups as secondary stabilizer is used in a quantity of 0.01 to 1% by weight and preferably in a quantity of 0.1 to 0.5% by weight, based on the total quantity of the system to be stabilized. However, the percentage content of the secondary stabilizer should not be so high that coagulation of the polymer dispersion is completely prevented.

According to the invention, polyesters containing sulfo groups are almost identical in their stabilizing behavior to naphthalenesulfonic acid/formaldehyde condensates without having the wetting properties of the octyl sulfate.

In general, synthetic polymers are not biodegradable. A precondition for the biological degradation of all polymers is that, before the actual metabolization, they should be able to be split up into relatively small fragments accessible to the metabolic processes.

In the case of the naphthalene sulfonic acid/formaldehyde condesates attached by C—C bonds, splitting is not possible under the conditions prevailing in a sewage treatment plant. By contrast, polyesters contain ester bonds which can be cleaved in a chemical or enzymatic reaction.

However, for use as a secondary stabilizer, a polyester must contain such stable bonds that it is not split and hence does not lose its effectiveness under the emulsion polymerization conditions alone. On the other hand, however, the bonds should also not be so stable that no bond cleavage occurs in contact with active microorganisms in the sewage plant. Accordingly, a balanced ratio of hydrolysis stability to hydrolysis lability is required.

Polyesters containing only sulfosuccinic acid or maleic acid or fumaric acid units have been found to be extremely resistant to hydrolysis and hence poorly biodegradable. By incorporating other dicarboxylic acid units, hydrolysis can be accelerated without impairing the effectiveness of the polyester as a secondary stabilizer.

The use of the water-soluble oligomeric sulfosuccinic acid esters in the process according to the invention solves the problems arising in known emulsion polymerization processes, particularly in regard to the biological degradability of the stabilizers and their wetting effect. In addition, the oligomeric sulfosuccinic acid esters used in the process according to the invention are at least identical in their stabilizing properties to the naphthalenesulfonic acid/formaldehyde condensates.

The following Examples are intended to illustrate the invention without limiting it in any way.

EXAMPLES

All percentages are by weight, unless otherwise indicated.

Example 1

194.7 g (1.65 moles) of hexane-1,6-diol, 139.7 g (1.425 moles) of maleic anhydride, 11.0 g (0.075 mole) of adipic acid, 6.0 g of toluene sulfonic acid hydrate, 0.5 g of triphenyl phosphite and 50 g of toluene were introduced into and melted in a 1 liter three-necked flask. The contents of the flask were then stirred under reflux in a nitrogen atmosphere at 115° C. and the water of reaction formed was azeotropically distilled off. The reaction was continued to an acid value of <3. The toluene was then removed and the product was cooled to room temperature,.

150 g of the polyester and 150 g of Dowanol PM (methoxypropanol) were introduced into a 1 liter four-necked flask equipped with a stirrer, thermosensor, condenser, dropping funnel and nitrogen inlet. 0.25 g of diethylhexyl sulfosuccinate was added and the mixture was heated to 75° C. 58.3 g (0.307 mole) of $Na_2S_2O_5$ were dissolved in 105 g of water and the resulting solution was added dropwise to the reaction mixture, followed by stirring for 5 hours at 75° C. A water-soluble polyester with a solids content of 52% was obtained.

Example 2

97.4 g (0.825 mole) of hexane-1,6-diol, 143.6 g (0.825 mole) of decane-1, 10-diol, 139.7 g (1.425 mole) of maleic anhydride and 11.0 g (0.075 mole) of adipic acid were reacted as in Example 1 to form a polyester of which 150 g were sulfited with 51.2 g (0.269 mole) of $Na_2S_2O_5$. A polyester with a solids content of 57% was obtained.

Example 3

171.6 g (1.65 mole) of neopentyl glycol, 139.7 g (1.425 mole) of maleic anhydride and 11.0 g (0.075 mole) of adipic acid were reacted as in Example 1 to form a polyester of which 150 g were sulfited with 62.5 g (0.329 mole) of $Na_2S_2O_5$. A polyester with a solids content of 59% was obtained.

Example 4

194.7 g (1.65 mole) of hexane-1,6-diol, 132.3 g (1.35 mole) of maleic anhydride and 21.9 g (0.15 mole) of adipic acid were reacted as in Example 1 to form a polyester of which 150 g were sulfited with 54.7 g (0.288 mole) of $Na_2S_2O_5$. A polyester with a solids content of 57% was obtained.

Example 5

194.7 g (1.65 mole) of hexane-1,6-diol, 117.6 g (1.2 mole) of maleic anhydride and 43.8 g (0.3 mole) of adipic acid were reacted as in Example 1 to form a polyester of which 150 g were sulfited with 47.7 g (0.251 mole) of $Na_2S_2O_5$. A polyester with a solids content of 56% was obtained.

Example 6

660.0 g (1.65 mole) of Dianol 22 (adduct of 2 moles of ethylene oxide with bisphenol A), 139.7 g (1.425 mole) of maleic anhydride and 11.0 g (0.075 mole) of adipic acid were reacted as in Example 1 to form a polyester of which 150 g were sulfited with 24.6 g (0.13 mole) of $Na_2S_2O_5$. A polyester with a solids content of 60% was obtained.

Example 7

In a 1-liter three-necked flask equipped with a stirrer, nitrogen inlet and reflux condenser+water separator, 268.0 g of sodium sulfoisophthalic acid (1 mole), 212.0 g of diethylene glycol (2 moles) and 1.4 g of Swedcat 4® (a commercially available catalyst produced by Swedstab) were heated to 150° C. together with 50 ml of xylene. 43 ml of water were removed while stirring over a period of 4 hours. 110.0 g (0.75 mole) of adipic acid were then added and another 29 ml of water were removed while stirring up to a temperature of 200° C.

Comparison Example 1

194.7 g (1.65 mole) of hexane-1,6-diol and 147 g (1.5 mole) of maleic anhydride were reacted as in Example 1 to form a polyester of which 150 g were sulfited with 59.0 g (0.31 mole) of $Na_2S_2O_5$. A polyester with a solids content of 52% was obtained.

Testing of the Stabilizing Properties

The suitability of the oligomeric sulfosuccinic acid esters was established in a series of tests using a process similar to that described in DE-OS 2 210 957. A styrene latex stabilized exclusively with potassium oleate was acidified with acetic acid in the presence of various quantities of secondary stabilizer and the stability of the system was evaluated from the coagulate content (cf. Ind. Eng. Chem., 40 (1948) 2193).

A polystyrene latex was polymerized from styrene, potassium oleate and water using 4,4'-azo-bis-(4-cyanovaleric acid) as initiator. A latex with a solids content of 30% and a particle size of around 100 nm was obtained. 50 ml of the latex coagulated completely on addition of 2.5 ml of 10% acetic acid which is attributable to the conversion of the potassium oleate into oleic acid and the resulting loss of stabilization. Similarly to the tests described in DE-OS 2 210 957, secondary stabilizer is added to the latex in various concentrations. From the coagulate content after acidification, it is possible to asses how well a secondary a stabilizer is suited to this application.

The results are set out in Table 1.

TABLE 1

Stabilization Against Coagulation

| Co-stabilizer | Stability at Various Concentrations of the Co-stabilizer | | |
|---|---|---|---|
| | 0.25% | 0.50% | 1.0% |
| Lomar LS | 100% Coag. | Stable, coag. after 3 days | Stable <1% coag. |
| Lomar PWA | 100% Coag. | Stable, coag. after 1 day | Stable <1% coag. |
| Texapon CPS | Stable <1% coag. | Stable <1% coag. | Stable <1% coag. |
| Example 1 | 100% Coag. | Stable <1% coag. | Stable <1% coag. |
| Example 2 | 100% Coag. | Stable, coag. after 1 day | Stable <1% coag. |
| Example 3 | 100% Coag. | Stable, coag. after 1 day | Stable <1% coag. |
| Example 6 | 100% Coag. | 100% Coag. | Stable <1% coag. |
| Example 7 | 100% Coag. | 100% Coag. | Stable <1% coag. |

Legend to Table 1:
Lomar LS Naphthalenesulfonic acid/formaldehyde condensate, Na salt
Lomar PWA Naphthalenesulfonic acid/formaldehyde condensate, $NH_4$ salt
Texapon CPS Octyl sulfate Hydrolysis stability was determined by storing 5% aqueous solutions of the polyesters at 50° C. pH value and acid value (AV) were determined after the times shown. An increasing acid value and/or pH value indicate hydrolysis.

TABLE 2

Hydrolysis Stability

| | Example 1 pH Value/AV | Example 2 pH/Value/Av | Comparison Example pH Value/AV |
|---|---|---|---|
| Start | 5.68/0.10 | 5.12/0.12 | 6.22/0.07 |
| 1 Week | 5.15/0.15 | 4.73/0.17 | 5.91/0.06 |
| 3 Weeks | 4.69/0.36 | 4.07/0.47 | 5.45/0.08 |
| 15 Weeks | 3.07/7.27 | 2.26/10.66 | 4.52/0.80 |

Biological degradability was measured by the Zahn-Wellens Test (OECD Test 302 B). The results are set out in Table 3.

TABLE 3

Biological Degradability in the Zahn-Wellens Test

| | Conc. | Biological Degradability in % After | | | |
|---|---|---|---|---|---|
| | mg/l | 7 Days | 14 Days | 21 Days | 28 Days |
| Example 1 | 250 | 50 | 70 | 78 | 83 |
| Example 1 | 500 | 21 | 64 | 78 | 82 |

Using the inoculum pre-adapted in the Zahn-Wellens Test, the biological degradability of the polyester of Example 1 was tested by comparison with the polyester of Comparison Example 1 in the Closed Bottle Test (OECD Test 301 D). The results are set out in Table 4.

TABLE 4

Biological Degradability in the CB Test

| | Conc. | Biological Degradability in % After | | | |
|---|---|---|---|---|---|
| | mg/l | 7 Days | 14 Days | 21 Days | 28 Days |
| Example 1 | 2 | 8 | 14 | 32 | 50 |
| Example 1 | 5 | 7 | 25 | 27 | 51 |
| Comp. Ex. 1 | 2 | 0 | 3 | 0 | 34 |
| Comp. Ex. 1 | 5 | 0 | 4 | 0 | 36 |

The direct comparison shows the improved degradability of the polyester according to the invention.

We claim:

1. In a process for the production of emulsion polymers wherein an emulsion of monomers in water is prepared in the presence of a stabilizing amount of a soap as a primary stabilizer and the emulsion polymerized to form the emulsion polymer wherein a secondary stabilizer is used to further stabilize the emulsion polymer, the improvement which comprises: a biologically degradable secondary stabilizer comprising a polyester containing residues of:

a) diols
   b) dicarboxylic acids containing olefinic double bonds comprising at least one member selected from the group consisting of maleic acid and fumaric acid, in an amount of from 70 mole-% to 99 mole-% of the total quantity of dicarboxylic acids in the polymer, wherein from 50 mole-% to 100 mole-% of the dicarboxylic acids containing double bonds being sulfited; and
   c) 1 mole-% to 30 mole-%, based on the total quantity of dicarboxylic acids, of dicarboxylic acids with no olefinic double bonds and no sulfo groups, containing from 2 to 3 or 5 to 18 carbon atoms.

2. The process as claimed in claim 1, wherein the diols comprise at least one member selected from the group consisting of diols containing 2 to 10 carbon atoms and adducts of diols containing 2 to 10 carbon atoms with 1 to 5 moles of at least one of ethylene and propylene oxide.

3. The process as claimed in claim 1 wherein the diols comprise adducts of at least one member selected from the group consisting of ethylene oxide and propylene oxide with dihydric phenols.

4. The process as claimed in claim 1 wherein at least one of maleic acid and fumaric acid are present in quantities of 99 to 90 mole-% and the dicarboxylic acids with no double bonds or sulfo groups are present in quantities of 1 to 10 mole-%, based on the total quantity of dicarboxylic acid in the polyester.

5. The process as claimed in claim 1 wherein the equivalent ratio of COOH group of the acid to OH of the diol in monomers which form the polyester is from 2:1 to 1:2.

6. The process as claimed in claim 1 wherein the emulsion polymer is selected from the group consisting of polystyrene, styrene-containing copolymers, polychloroprene and chloroprene-containing copolymers.

7. The process as claimed in claim 6, wherein the styrene-containing copolymers are selected from the group consisting of acrylonitrile/butadiene/styrene (ABS) and styrene/acrylonitrile, the styrene component comprising at least one member selected from the group consisting of styrene, α-methyl styrene, chlorostyrene and vinyl toluene.

8. The process as claimed in claim 7, wherein the primary stabilizer is present in a quantity of 0.01 to 5% by weight, based on a total weight of the emulsion to be stabilized.

9. The process as claimed in claim 1 wherein the secondary stabilizer is present in a quantity of 0.01 to 1% by weight, based on a total weight of the emulsion to be stabilized.

10. The process of claim 5 wherein the ratio of COOH groups to OH groups is from 1.5:1 to 1:1.5.

11. The process as claimed in claim 2 wherein the diols comprise adducts of at least one member selected from the group consisting of ethylene oxide and propylene oxide with dihydric phenols.

12. The process as claimed in claim 2 wherein at least one of maleic acid and fumaric acid are present in quantities of 99 to 90 mole-% and the dicarboxylic acids with no double bonds or sulfo groups are present in quantities of 1 to 10 mole-%, based on the total quantity of dicarboxylic acid in the polyester.

13. The process as claimed in claim 2 wherein the equivalent ratio of COOH group of the acid to OH of the diol in monomers which form the polyester is from 2:1 to 1:2.

14. The process as claimed in claim 2 wherein the emulsion polymer is selected from the group consisting of polystyrene, styrene-containing copolymers, polychloroprene and chloroprene-containing copolymers.

15. The process as claimed in claim 2, wherein the styrene-containing copolymers are selected from the group consisting of acrylonitrile/butadiene/styrene (ABS) and styrene/acrylonitrile, the styrene component comprising at least one member selected from the group consisting of styrene, α-methyl styrene, chlorostyrene and vinyl toluene.

16. The process as claimed in claim 2, wherein the primary stabilizer is present in a quantity of 0.01 to 5% by weight, based on a total weight of the emulsion to be stabilized.

17. The process as claimed in claim 2 wherein the secondary stabilizer is present in a quantity of 0.01 to 1% by weight, based on a total weight of the emulsion to be stabilized.

18. The process of claim 13 wherein the ratio of COOH groups to OH groups is from 1.5:1 to 1:1.5.

19. The process as claimed in claim 3 wherein at least one of maleic acid and fumaric acid are present in quantities of 99 to 90 mole-% and the dicarboxic acids with no double bonds or sulfo groups are present in quantities of to 1to 10 mole-%, based on the total quantity of dicarboxylic acid in the polyester.

* * * * *